W. H. DOBSON.
Scroll-Saws.
No. 147,913. Patented Feb. 24, 1874.
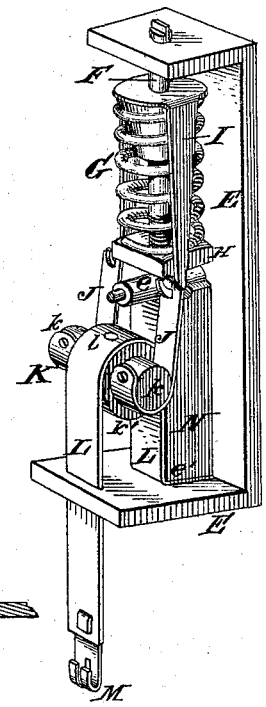
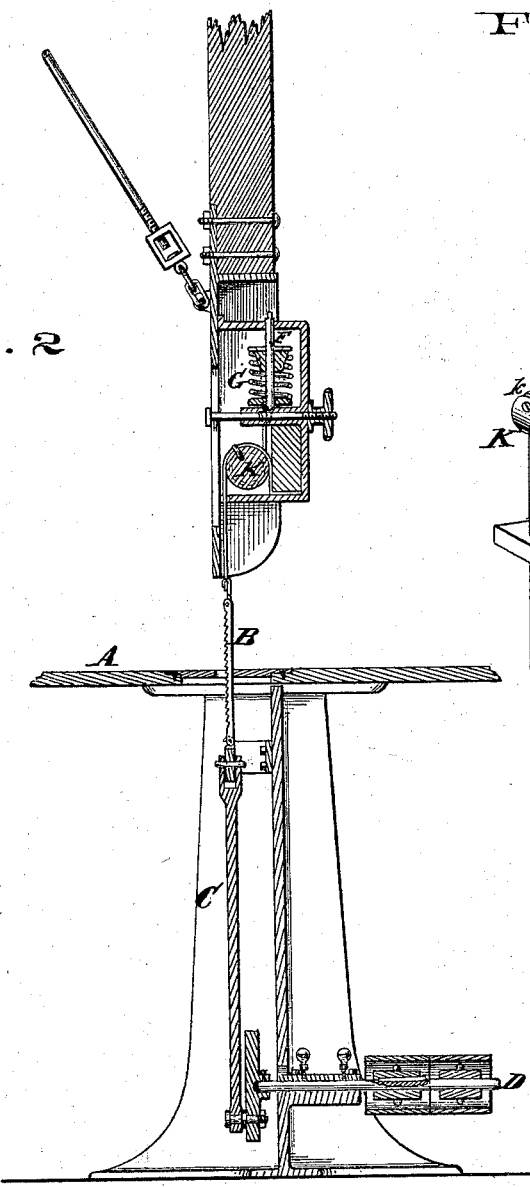
Attest
Inventor
William H. Dobson
By F. Millward
Attorney

UNITED STATES PATENT OFFICE.

WILLIAM H. DOBSON, OF CINCINNATI, OHIO, ASSIGNOR TO H. J. CORDESMAN, JR., & BRO., OF SAME PLACE.

IMPROVEMENT IN SCROLL-SAWS.

Specification forming part of Letters Patent No. 147,913, dated February 24, 1874; application filed September 30, 1873.

*To all whom it may concern:*

Be it known that I, WILLIAM H. DOBSON, of Cincinnati, Hamilton county, State of Ohio, have invented a certain new and useful Improvement in Scroll-Saws, of which the following is a specification:

My invention relates to the class of devices designed to strain scroll-saws and other reciprocating instrumentalities, while under a reciprocating motion; and my invention consists of a straining device composed essentially of four elements, to wit: A differential traversing-pulley, a strap to connect the saw with the large diameter of the pulley, a spring for straining, and a strap or straps to connect the straining-spring with the small parts of the pulley, the object being to have but little motion of the spring with a great extent of reciprocating motion of the saw, and but little friction of the moving parts.

Figure 1 is a perspective view of my straining device complete for attachment to a scroll-saw or other instrumentality requiring straining while in motion. Fig. 2 is a vertical section of a reciprocating scroll-saw to which my straining device is applied.

The scroll-saw to which my straining device is applied in Fig. 2 is of the ordinary description, A being the table, B the saw, C the driving-pitman, and D the driving-shaft. The construction of my straining device is as follows: A frame, E, is provided, between the upper end of which and the projection $e$ a rod, F, is supported, surrounded by the straining-spring G, which rests upon an adjustable nut, H, upon said rod. A yoke, I, is fitted to move freely up and down the rod F, and as it embraces or rests upon the spring it is adapted to compress the latter between the yoke itself and the nut H. The yoke is hooked or otherwise attached to the straps J, which are secured to the small diameter ends $k$ of a differential pulley, K, in the manner shown. The central portion $k'$ of the differential pulley is embraced by a strap, L, which is secured to it by pin $l$, one end of the strap being secured to the frame E at $e'$, and the other end adapted for attachment to the saw or other reciprocating instrumentality, by means of the hook M, or otherwise.

In the operation of the machine, when the saw is descending, the differential pulley, while revolving, descends at half the rate of speed of the saw, and this descent of the pulley is against the action of the straining spring, as owing to the small diameter of the ends for the straps J they cannot be unwound as rapidly as the pulley descends. The spring is, therefore, necessarily compressed in the descent of the saw. In the return-stroke the saw is carried up by the force of the spring, owing to the difference of the leverage between the radius of the larger part of the differential pulley and the smaller part. To prevent displacement of the differential pulley while in motion, a bed or track, N, is provided, upon which the strap L is laid as the pulley ascends, and the straps J are slightly inclined so as to cause the pulley K with its strap L to hug the track or bed N, and thus remain in proper line.

It will be seen that owing to the traversing character of the pulley K, and the peculiarity of its connection with the spring G, that the motion of the spring is but slight, and consequently the strain imparted by it to the saw is maintained nearly uniform during the reciprocating movement of the saw, or other reciprocating instrumentality.

It is obvious that this straining device is applicable to mortising-machines, reciprocating tenoning-machines, and other analogous use, in which a reciprocating instrumentality is employed, which requires straining to produce a reverse action.

This device may be arranged for vertical action, horizontal action, or inclined, and the spring may be connected with the straps in many other ways from that shown without departing from the characteristic features of my invention.

I claim—

For a scroll-saw, or other analogous use, the straining device herein described, consisting of differential traversing-pulley K, connecting-straps J L, and spring G, connected and operating substantially in the manner and for the purpose specified.

In testimony of which invention I hereunto set my hand.

W. H. DOBSON.

Witnesses:
FRANK MILLWARD,
J. L. WARTMANN.